(12) United States Patent
Olsen et al.

(10) Patent No.: US 7,262,694 B2
(45) Date of Patent: Aug. 28, 2007

(54) MULTIFUNCTIONAL, INTELLIGENT POWER AND COMMUNICATION DEVICE

(75) Inventors: Ib Ingemann Olsen, New York, NY (US); Nicholas Blaise Pasquale, Somers, NY (US)

(73) Assignee: Gaia Power Technologies, Inc., New York, NY (US)

( * ) Notice: Subject to any disclaimer, the term of this patent is extended or adjusted under 35 U.S.C. 154(b) by 83 days.

(21) Appl. No.: 10/710,088

(22) Filed: Jun. 17, 2004

(65) Prior Publication Data

US 2005/0280528 A1 Dec. 22, 2005

(51) Int. Cl.
*G08B 1/00* (2006.01)
*G08B 23/00* (2006.01)
*G08B 1/08* (2006.01)
*H04Q 1/30* (2006.01)
*H04Q 7/00* (2006.01)

(52) U.S. Cl. ................ 340/531; 340/539.14
(58) Field of Classification Search ... 340/531–538.17, 340/539.1, 500, 501, 508, 515–517, 539.11–539.3, 340/2.28, 825, 3.1, 3.3–3.32, 3.43, 3.44, 340/3.8, 292, 425.1, 425.2, 657–664, 690; 700/22, 286, 292, 295
See application file for complete search history.

(56) References Cited

U.S. PATENT DOCUMENTS

| 4,415,204 | A | * | 11/1983 | Cavrak | 299/1.05 |
|---|---|---|---|---|---|
| 4,467,314 | A | * | 8/1984 | Weikel et al. | 700/295 |
| 5,818,125 | A | * | 10/1998 | Manchester | 307/66 |
| 6,169,476 | B1 | * | 1/2001 | Flanagan | 340/286.02 |
| 6,392,538 | B1 | * | 5/2002 | Shere | 340/539.26 |
| 6,633,823 | B2 | * | 10/2003 | Bartone et al. | 702/57 |
| 6,665,620 | B1 | * | 12/2003 | Burns et al. | 702/62 |
| 6,697,951 | B1 | * | 2/2004 | Sinha et al. | 713/300 |
| 6,757,528 | B1 | * | 6/2004 | Cardina et al. | 455/426.2 |
| 6,832,135 | B2 | * | 12/2004 | Ying | 700/295 |
| 6,861,956 | B2 | * | 3/2005 | Ying | 340/825.69 |
| 6,894,609 | B2 | * | 5/2005 | Menard et al. | 340/531 |
| 7,049,971 | B2 | * | 5/2006 | Guillory | 340/601 |
| 2003/0158609 | A1 | * | 8/2003 | Chiu | 700/22 |
| 2004/0070518 | A1 | * | 4/2004 | Whittle et al. | 340/907 |
| 2005/0195090 | A1 | * | 9/2005 | Finan et al. | 340/656 |

* cited by examiner

*Primary Examiner*—Benjamin C. Lee
*Assistant Examiner*—Jennifer Mehmood
(74) *Attorney, Agent, or Firm*—Fish & Richardson P.C.

(57) ABSTRACT

The current invention is a device connected to the power grid in order to perform beneficial functions for the end user and/or utility company such as backup power, power quality improvement, peak shaving of the electrical load, etc. Inside the device would be energy storage devices such as batteries, and intelligent hardware and software controlling charging, discharging and interactive communications.

45 Claims, 3 Drawing Sheets

MULTIFUNCTIONAL, INTELLIGENT POWER AND COMMUNICATION DEVICE

BACKGROUND OF INVENTION

The invention relates to battery and inverter configuration and more specifically with increased efficiency.

DESCRIPTION OF PRIOR ART

The current electricity infrastructure relies on electricity production and delivery on demand. Some critical operations have back-up generators and or uninterruptible power systems, which can provide local power for a limited time, but it is not wide spread and the usage of distributed generators is not economically and environmentally optimized.

The communication infrastructure today relies on a combination of landlines and wireless systems. In case of emergencies where the landlines are cut and/or a few strategic wireless towers are lost, the communication system can no longer operate.

There is still room for improvement in the art.

SUMMARY OF INVENTION

The current invention is a device that is connected to a power grid in order to perform beneficial functions for the end user and/or utility company such as backup power, power quality improvement, peak shaving of the electrical load, etc. Inside the device would be energy storage devices such as batteries, and intelligent hardware and software controlling charging, discharging and interactive communications.

The device can be remotely controlled and monitored through the use of communications hardware as, but not limited to Internet, phone-line, power-line, wireless, cellular, RF, microwave, or a combination of multiples of these.

As an addition to the normal functions above, the device can be used in an emergency response mode to perform critical functions as a crisis may require. This can include acting as a self-powered communications repeater, network information server, communications node, or remote emergency data acquisition node.

The device can be outfitted with any number of sensors or be connected to critical equipment for emergency interaction.

The device could be configured to supplement its own energy storage with intelligent control of external sources such as generators, fuel cells, or others.

BRIEF DESCRIPTION OF DRAWINGS

Without restricting the full scope of this invention, the preferred form of this invention is illustrated in the following drawings.

DETAILED DESCRIPTION

The following description is demonstrative in nature and is not intended to limit the scope of the invention or its application of uses.

There are a number of significant design features and improvements incorporated within the invention.

The current invention is a device connected to the power grid in order to perform beneficial functions for the end user and/or utility company such as backup power, power quality improvement, peak shaving of the electrical load, etc. Inside the device would be energy storage devices such as batteries, and intelligent hardware and software controlling charging, discharging and interactive communications.

Figure 1:
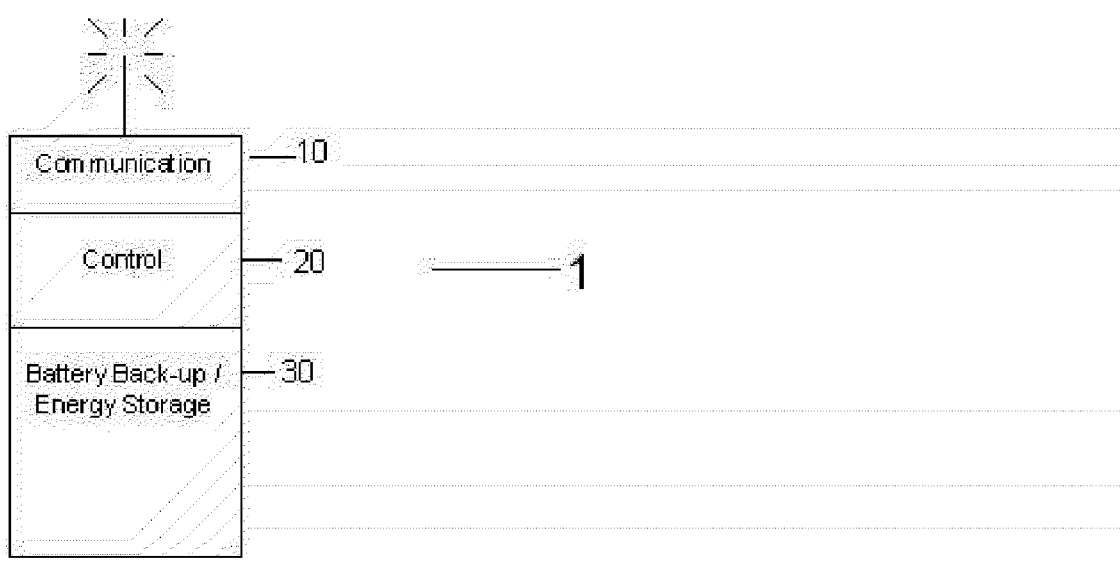
FIG. 1 is the basic device configuration.

The device's 1 basic components are shown in FIG. 1. The basic device configuration is a Battery/energy storage; advanced controller; and one or more communication devices where at least one is capable of functioning as a repeater unit to relay communication. The main components are the communication node 10, the intelligent controller 20 and the energy storage 30.

The device 1 consists of the energy storage component 30, such as a battery or capacitor bank, which is coupled to an intelligent power management controller 20. This controller 20 is capable of regulating the flow of energy in and out of the energy storage device 30 and may consist of components such as DC-AC converters, DC-DC converters, and AC-DC converters. The intelligent controller 20 is connected to a communications node 10 that has the capability to provide remote interaction with the controller via any number of communications protocols for information exchange, monitoring and/or control. By utilizing the individual capabilities of the invention in a networked-system approach, many new and important benefits are realized.

Functioning in normal mode, the device 1 can provide benefits to the utility, community, and end-user of electricity.

In case of a power and/or communications failure, the device 1 unit turns into a battery powered, redundant communications and distributed energy network.

Figure 2:
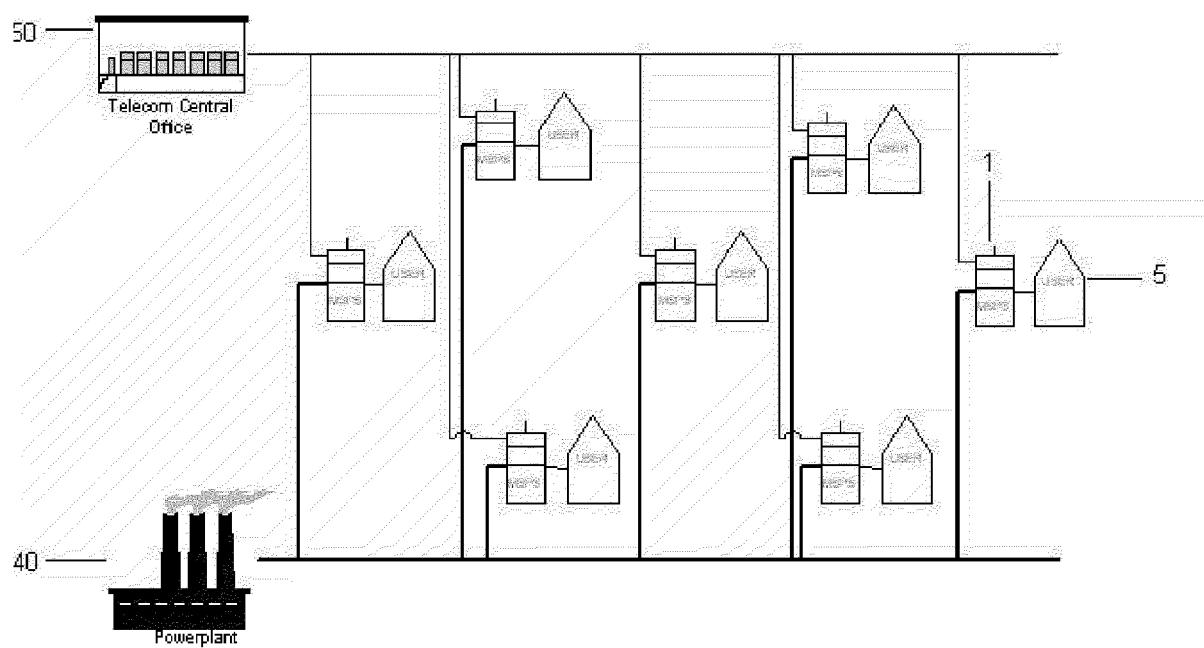
FIG. 2 displays normal operation.

During normal operation, as shown in FIG. 2, power is supplied from central power plant, and communication is facilitated using standard infrastructure. The device 1 provides power quality to the users and provides peak load reduction, peak shaving, and/or load leveling. The base device 1 contains its own energy storage and communications hardware necessary to perform remote inter-active AC load management. The device 1 can provide interaction with external generators and other sources and provides remote monitoring of energy parameters, such as time of usage.

Figure 3:
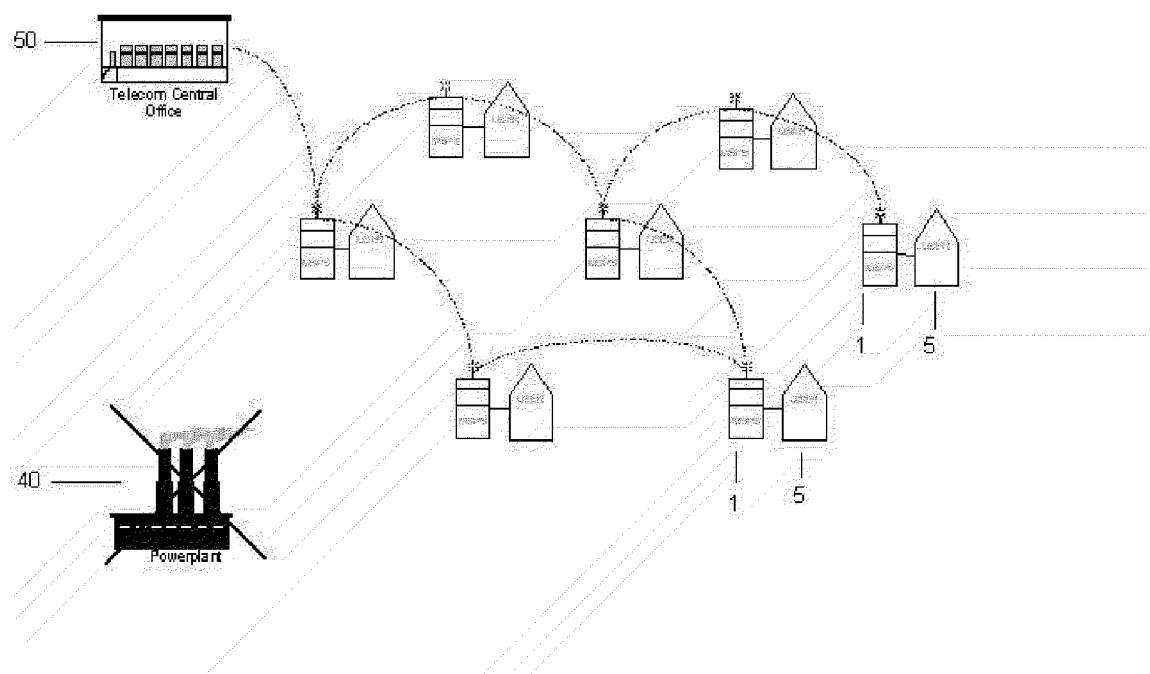
FIG. 3 displays emergency operation.

The device 1 during emergency operation is detailed in FIG. 3. The Power plant 40 cannot provide electricity and normal communication infrastructure is disabled. The device provides electricity to users, manages distributed electricity generation, and functions as a relay in an alternative communication network. The device 1 allows extended battery backup for users as well as for communications. The device 1 provides a communications link infrastructure.

Hardware and software added to the base device 1 enables the system to become a self-powered, emergency communications network node. This provides redundant communication network where one or more signal devices is capable of function as a repeater unit to relay communications.

The intelligent control 20 enables virtual networking of mobile generation. The communications streams, power data, remote sensor data, externally acquired data and global positioning data can be broadcast and relayed. The intelligent control 20 allows a controlled shutdown of critical equipment possible over wide area. The intelligent control 20 consists in the preferred embodiment of a computer processor connected to a memory means. These are common in the industry and not described in great detail here.

The device 1 can be equipped with sensors that can send information to local or centralized entities to warn about earthquakes, chemical or biological warfare, or other conditions that would require a response.

The device can be equipped with position devices (i.e. GPS) to transmit the exact location of unit for highly manageable emergency deployment. The device 11 can be equipped to manage local distributed power generators such as fuel-cells, gas turbines, and diesel or gas generators. It can work independently or complementary to the power grid and standard telephone and/or wireless networks as conditions allow.

ALTERNATIVE EMBODIMENTS

As an addition to the normal functions in the preferred embodiment above, the device 1 can be used in an emergency response mode to perform critical functions as a crisis may require. This can include acting as a self-powered communications repeater, network information server, communications node, or remote emergency data acquisition node.

The device can be outfitted with any number of sensors or be hooked to critical equipment for emergency interaction.

The device could be configured to supplement its own energy storage with intelligent control of external sources such as generators, fuel cells, or others.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A local power supply system for operation at a residential or commercial location comprising:
   an interface configured to enable the local power supply system to connect to a power distribution grid that supplies power to the location;
   a backup energy storage device configured to provide backup power to the location;
   a power management controller coupled to the backup energy storage device, the power management controller being configured to control the charging and discharging of the backup energy storage device and to detect one or more conditions enabling distinction between at least a normal operation mode and an emergency operation mode; and
   a wireless communications device, wherein:
   the power management controller is configured to control the distribution of energy from the backup energy storage device to enable the backup energy storage device to supplement power supplied to the location by a remote power plant through the power distribution grid when the one or more conditions detected by the power management controller collectively correspond to the normal operation mode,
   the power management controller is configured to control the distribution of energy from the backup energy storage device to provide backup power to the location and the wireless communications device when the one or more conditions detected by the power management controller collectively correspond to the emergency operation mode, and
   the wireless communications device is configured to enable communications between the location and one or more remote locations based at least in part upon the backup power provided by the backup energy storage device when the one or more conditions detected by the power management controller collectively correspond to the emergency operation mode; wherein, during emergency operation mode, the wireless communications device enables the power management controller to communicate with and control one or more remote devices despite a standard landline telephone communications infrastructure that services the residential or commercial location being disabled.

2. The local power supply system of claim 1 wherein the local power supply system is configured to function as a self-powered, emergency communications network node during emergency operation mode.

3. The local power supply system of claim 1 wherein the wireless communications device comprises a network information server.

4. The local power supply system of claim 1 wherein the wireless communications device comprises a repeater to relay communications in a wireless mesh network.

5. The local power supply system of claim 1 wherein:
   the power management controller is configured to detect a failure of the power distribution grid to supply power to the location from the remote power plant; and
   the failure of the power distribution grid to supply power to the location from the remote power plant is a condition that corresponds to the emergency operation mode.

6. The local power supply system of claim 1 wherein:
   the power management controller is configured to detect a failure of the power distribution grid to supply power to the location from the remote power plant and to detect that a standard landline telephone communications infrastructure that services the location is disabled; and
   the failure of the power distribution grid to supply power to the location from the remote power plant and the disablement of the standard landline telephone communications infrastructure that services the location are conditions that collectively correspond to the emergency operation mode.

7. The local power supply system of claim 6 wherein, during emergency operation mode, the wireless communications device is further configured to operate as a relay in an alternative communications network.

8. The local power supply system of claim 6 wherein, during emergency operation mode, the power management controller is further configured to control a local power generator in order to provide additional backup power to the residential or commercial location.

9. The local power supply system of claim 8 wherein the local power generator comprises one or more of a fuel cell, a gas turbine, a diesel generator, and a gas generator.

10. The local power supply system of claim 1 wherein the backup energy storage device comprises a battery.

11. The local power supply system of claim 1 wherein the backup energy storage device comprises a capacitor.

12. The local power supply system of claim 1 wherein, during normal operation mode, the power management controller is configured to control the distribution of energy from the backup energy storage device to supplement the power supplied to the location by the remote power plant through the power distribution grid in order to accomplish one or more of power quality improvement, peak load reduction, peak shaving, and load leveling for the residential or commercial location.

13. The local power supply system of claim 1 wherein the wireless communications device is configured to enable remote control of the local power supply system.

14. The local power supply system of claim 13 wherein remote control of the local power supply system comprises at least one of remote energy usage monitoring, power quality improvement, peak load reduction, peak shaving, and load leveling for the residential or commercial location.

15. A local emergency power supply and communications system comprising:
  a backup energy storage device configured to provide backup power to a residential or commercial location;
  a controller coupled to the backup energy storage device, the controller being configured to control the charging and discharging of the backup energy storage device;
  a communications device coupled to the controller; and
  an emergency detection sensor configured to detect one or more conditions enabling distinction between an emergency operating mode and at least one other operating mode, wherein
    the controller is configured to control the distribution of energy from the backup energy storage device to enable the backup energy storage device to supplement power supplied to the location by a remote power plant when the one or more conditions detected by the emergency detection sensor collectively correspond to a mode other than the emergency operating mode and to control the distribution of energy from the backup energy storage device to provide backup power to the location and the communications device in response to the emergency detection sensor detecting one or more conditions that collectively correspond to the emergency operating mode, and
    the communications device is configured to enable communication of an emergency condition to a remote communications device in response to the emergency detection sensor detecting the one or more conditions that collectively correspond to the emergency operating mode wherein, during emergency operation mode, the communications device enables the controller to communicate with and control one or more remote devices despite a standard landline telephone communications infrastructure that services the residential or commercial location being disabled.

16. The local emergency power supply and communications system of claim 15 wherein the emergency detection sensor is an earthquake sensor and the one or more conditions that collectively correspond to the emergency operating mode are conditions reflective of an earthquake.

17. The local emergency power supply and communications system of claim 15 wherein the emergency detection sensor is a chemical warfare sensor and the one or more conditions that collectively correspond to the emergency operating mode are conditions reflective of an incident of chemical warfare.

18. The local emergency power supply and communications system of claim 15 wherein the emergency detection sensor is a biological warfare sensor and the one or more conditions that collectively correspond to the emergency operating mode are conditions reflective of an incident of biological warfare.

19. The local emergency power supply and communications system of claim 15 wherein the communications device is configured to enable the controller to communicate with and shut down one or more remote pieces of critical equipment over a wide area in response to the emergency detection sensor detecting one or more conditions that collectively correspond to the emergency operating mode.

20. The local emergency power supply and communications system of claim 15 wherein the communications device is configured to operate in conjunction with a standard landline telephone communications infrastructure.

21. The local emergency power supply and communications system of claim 15 wherein the communications device comprises a wireless communications device.

22. The local emergency power supply and communications system of claim 21 wherein the communications device is configured to operate as a repeater to relay communications in a wireless mesh network.

23. The local emergency power supply and communications system of claim 15 wherein the backup energy storage device comprises a battery.

24. The local emergency power supply and communications system of claim 15 wherein the backup energy storage device comprises a capacitor.

25. The local emergency power supply and communications system of claim 15 wherein the backup energy storage device is configured to provide backup power to the location and the wireless communications device only after the emergency detection sensor detects one or more conditions that collectively correspond to the emergency operating mode.

26. The local emergency power supply and communications system of claim 15 wherein the backup energy storage device is configured to begin providing backup power to the location and the wireless communications device after the emergency detection sensor detects one or more conditions that collectively correspond to the emergency operating mode.

27. The local emergency power supply and communications system of claim 15 further comprising a global positioning system device configured to determine a precise indication of the location, wherein the communications device is further configured to enable the communication of the precise indication of the location to the remote communications device in response to the emergency detection sensor detecting one or more conditions that collectively correspond to the emergency operating mode.

28. The local power supply system of claim 1 wherein the location comprises a residential location.

29. The local power supply system of claim 1 wherein the location comprises a commercial location.

30. The local power supply system of claim 1 wherein the power management controller comprises an intelligent controller that includes a processor and memory.

31. The local power supply system of claim 1 wherein the wireless communications device is configured to communicate over a communications infrastructure other than a standard landline telephone communications infrastructure that services the location.

32. The local power supply system of claim 31 wherein the wireless communications device is configured to communicate over a cellular telephone communications infrastructure.

33. The local emergency power supply and communications system of claim 15 wherein the location comprises a residential location.

34. The local emergency power supply and communications system of claim 15 wherein the location comprises a commercial location.

35. The local emergency power supply and communications system of claim 15 wherein the controller comprises an intelligent controller that includes a processor and memory.

36. The local emergency power supply and communications system of claim 15 wherein the backup energy storage device is configured to provide backup power to the location and the wireless communications device only in response to the emergency detection sensor detecting one or more conditions that collectively correspond to the emergency operating mode.

37. A local power supply system for operation at a residential or commercial location, the local power supply system being configured for connectivity to a power distribution grid that supplies power to the residential or commercial location from a remote power plant during normal operation, the local power supply system comprising:
a backup energy storage device configured to provide backup power to the residential or commercial location;
a power management controller coupled to the backup energy storage device, the power management controller being configured to regulate the flow of energy into and out of the backup energy storage device; and
a wireless communications device coupled to the power management controller, wherein:
the local power supply system is configured to operate in emergency operation mode if the power distribution grid fails to supply power to the residential or commercial location from the remote power plant and if a standard landline telephone communications infrastructure that services the residential or commercial location is disabled, and
during emergency operation mode:
the backup energy storage device is configured to provide backup power to the residential or commercial location and the wireless communications device,
the wireless communications device is configured to enable communications between the residential or commercial location and one or more remote locations based at least in part upon the backup power provided by the backup energy storage device and to enable the power management controller to communicate with and shut down one or more remote pieces of critical equipment despite the standard landline telephone communications infrastructure that services the residential or commercial location being disabled, and
the power management controller is configured to control a local power generator in order to provide additional backup power to the residential or commercial location, the local power generator comprising one or more of a fuel cell, a gas turbine, a diesel generator, and a gas generator.

38. The local power supply system of claim 37 wherein:
the power management controller is configured to detect one or more conditions enabling distinction between at least a normal operation mode and an emergency operation mode;
the backup energy storage device is configured to provide backup power to the residential or commercial location and the wireless communications device in response to the power management controller detecting one or more conditions that collectively correspond to the emergency operation mode;
the wireless communications device is configured to enable communications between the residential or commercial location and one or more remote locations based at least in part upon the backup power provided by the backup energy storage device and to enable the power management controller to communicate with and shut down one or more remote pieces of critical equipment despite the standard landline telephone communications infrastructure that services the residential or commercial location being disabled in response to the power management controller detecting one or more conditions that collectively correspond to the emergency operation mode; and
the power management controller is configured to control a local power generator in order to provide additional backup power to the residential or commercial location in response to the power management controller detecting one or more conditions that collectively correspond to the emergency operation mode, the local power generator comprising one or more of a fuel cell, a gas turbine, a diesel generator, and a gas generator.

39. The local power supply system of claim 37 wherein:
the power management controller is configured to detect one or more conditions enabling distinction between at least a normal operation mode and an emergency operation mode; and
the power management controller is configured to control the distribution of energy from the backup energy storage device to enable the backup energy storage device to supplement power supplied to the location by the remote power plant though the power distribution grid when one or more conditions detected by the power management controller collectively correspond to the normal operation mode.

40. The local power supply system of claim 37 wherein the local power supply system is configured to function as a self-powered, emergency communications network node during emergency operation mode.

41. The local power supply system of claim 37 wherein the wireless communications device comprises a network information server.

42. The local power supply system of claim 37 wherein the wireless communications device comprises a repeater to relay communications in a wireless mesh network.

43. The local power supply system of claim 37 wherein, during emergency operation mode, the wireless communications device is further configured to operate as a relay in an alternative communications network.

44. A method for providing backup power to a residential or commercial location using a backup energy storage device configured to provide backup power to the residential or commercial location and that includes a power management controller configured to regulate the flow of energy into and out of the backup energy storage device and a wireless communications device, the residential or commercial location receiving power from a remote power plant during normal operation, the method comprising:

detecting a failure of the remote power plant to provide power to the residential or commercial location using the power management controller;

detecting a disablement of a standard landline telephone communications infrastructure that services the residential or commercial location using the power management controller;

determining to operate the backup energy storage device in emergency operation mode based on detecting the failure of the remote power plant to provide power to the residential or commercial location and detecting that the standard landline telephone communications infrastructure is disabled, wherein operating the backup energy storage device in emergency operation mode comprises:

providing backup power to the residential or commercial location and the wireless communications device, using the wireless communications device to enable communications between the residential or commercial location and one or more remote locations based at least in part upon the backup power provided by the backup energy storage device, using the wireless communications device to enable the power management controller to communicate with and shut down one or more remote pieces of critical equipment despite the standard landline telephone communications infrastructure that services the residential or commercial location being disabled, and controlling a local power generator using the power management controller in order to provide additional backup power to the residential or commercial location, the local power generator comprising one or more of a fuel cell, a gas turbine, a diesel generator, and a gas generator.

45. A local power supply device for operation at a residential or commercial location, the local power supply device being configured for connectivity to a power distribution grid that supplies power to the residential or commercial location from a remote power plant during normal operation, the local power supply device comprising:

a backup energy storage means configured to provide backup power to the residential or commercial location;

a power management controller means coupled to the backup energy storage device, the power management controller being configured to regulate the flow of energy into and out of the backup energy storage device; and a wireless communications device coupled to the power management controller means, wherein:

the local power supply device is configured to operate in emergency operation mode if the power distribution grid fails to supply power to the residential or commercial location from the remote power plant and if a standard landline telephone communications infrastructure that services the residential or commercial location is disabled, and during emergency operation mode:

the backup energy storage means is configured to provide backup power to the residential or commercial location and the wireless communications device, the wireless communications device is configured to enable communications between the residential or commercial location and one or more remote locations based at least in part upon the backup power provided by the backup energy storage means and to enable the power management controller means to communicate with and shut down one or more remote pieces of critical equipment despite the standard landline telephone communications infrastructure that services the residential or commercial location being disabled, and the power management controller means is configured to control a local power generator in order to provide additional backup power to the residential or commercial location, the local power generator comprising one or more of a fuel cell, a gas turbine, a diesel generator, and a gas generator.

\* \* \* \* \*